(12) United States Patent
Heim

(10) Patent No.: US 12,669,887 B2
(45) Date of Patent: Jun. 30, 2026

(54) DECODING TOUCH DATA BASED ON A CODE WORD PORTION

(71) Applicant: Microchip Technology Incorporated, Chandler, AZ (US)

(72) Inventor: Axel Heim, Munich (DE)

(73) Assignee: Microchip Technology Incorporated, Chandler, AZ (US)

( * ) Notice: Subject to any disclaimer, the term of this patent is extended or adjusted under 35 U.S.C. 154(b) by 3 days.

(21) Appl. No.: 18/429,684

(22) Filed: Feb. 1, 2024

(65) Prior Publication Data

US 2024/0353946 A1 Oct. 24, 2024

Related U.S. Application Data

(60) Provisional application No. 63/461,013, filed on Apr. 21, 2023.

(51) Int. Cl.
*G06F 3/041* (2006.01)
*G06F 3/044* (2006.01)

(52) U.S. Cl.
CPC .......... *G06F 3/0416* (2013.01); *G06F 3/0446* (2019.05)

(58) Field of Classification Search
CPC ...... G06F 3/041; G06F 3/0412; G06F 3/0416; G06F 3/041661; G06F 3/04166; G06F 3/044–0448
See application file for complete search history.

(56) References Cited

U.S. PATENT DOCUMENTS 9,927,933 B2 3/2018 Heim et al.
10,234,990 B2 3/2019 Hoch et al.

10,474,291 B2 11/2019 Lu et al.
11,966,536 B2 4/2024 Brady et al.
12,008,200 B1 * 6/2024 Tan ..................... G06F 3/04184
2008/0158167 A1 * 7/2008 Hotelling .............. G06F 1/3265
345/173
2019/0220141 A1 7/2019 Small et al.
(Continued)

FOREIGN PATENT DOCUMENTS

CN 107102758 B 4/2020 ............ G06F 3/041
CN 115328330 A 11/2022 .......... G06F 1/3234
WO 2018/211760 A1 11/2018 ............ G06F 3/041

OTHER PUBLICATIONS

International Search Report and Written Opinion, Application No. PCT/US2024/022717, 12 pages, Jul. 16, 2024.

*Primary Examiner* — Roberto W Flores

(74) *Attorney, Agent, or Firm* — SLAYDEN GRUBERT BEARD PLLC

(57) ABSTRACT

Systems having a capacitive touch sensing system with transmit and receive electrodes positioned to have mutual capacitances at node intersections that deviate when a node is touched; a processor; and a machine readable storage medium with instructions to: assign complete code words to transmit electrodes; identify a subset of transmit electrodes based on a prior touch position estimate; generate a transmit signal for the transmit electrodes; receive a first portion of a receive signal for receive electrodes indicative of capacitances; decode the first portion of the receive signal of receive electrodes using the first portions of the code words; and compute touch position estimates for the subset of transmit electrodes based on the decoded first portions of the receive signals.

24 Claims, 14 Drawing Sheets

(56)　　　　　　References Cited

U.S. PATENT DOCUMENTS

| | | | |
|---|---|---|---|
| 2021/0055822 A1 | 2/2021 | Small et al. | |
| 2022/0043537 A1 | 2/2022 | Lee et al. | |
| 2022/0365627 A1* | 11/2022 | Nakano | G06F 3/04182 |
| 2023/0051918 A1* | 2/2023 | Kim | H03M 1/662 |
| 2024/0019955 A1* | 1/2024 | Matsui | G06F 3/0416 |

* cited by examiner

TOUCH SURFACE

Tx11

Tx3

Tx

Rx

TIME

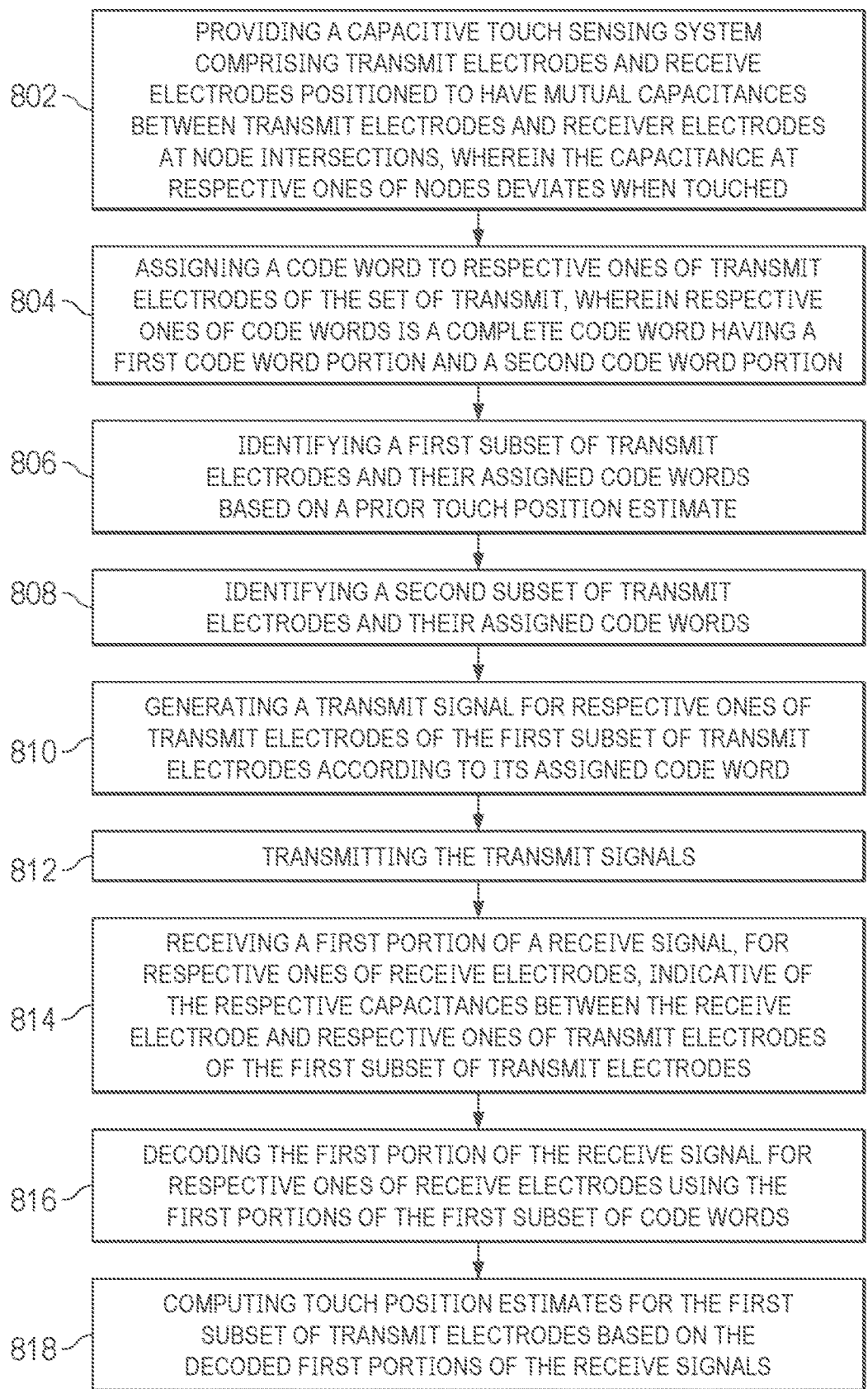

802 — PROVIDING A CAPACITIVE TOUCH SENSING SYSTEM COMPRISING TRANSMIT ELECTRODES AND RECEIVE ELECTRODES POSITIONED TO HAVE MUTUAL CAPACITANCES BETWEEN TRANSMIT ELECTRODES AND RECEIVER ELECTRODES AT NODE INTERSECTIONS, WHEREIN THE CAPACITANCE AT RESPECTIVE ONES OF NODES DEVIATES WHEN TOUCHED

804 — ASSIGNING A CODE WORD TO RESPECTIVE ONES OF TRANSMIT ELECTRODES OF THE SET OF TRANSMIT, WHEREIN RESPECTIVE ONES OF CODE WORDS IS A COMPLETE CODE WORD HAVING A FIRST CODE WORD PORTION AND A SECOND CODE WORD PORTION

806 — IDENTIFYING A FIRST SUBSET OF TRANSMIT ELECTRODES AND THEIR ASSIGNED CODE WORDS BASED ON A PRIOR TOUCH POSITION ESTIMATE

808 — IDENTIFYING A SECOND SUBSET OF TRANSMIT ELECTRODES AND THEIR ASSIGNED CODE WORDS

810 — GENERATING A TRANSMIT SIGNAL FOR RESPECTIVE ONES OF TRANSMIT ELECTRODES OF THE FIRST SUBSET OF TRANSMIT ELECTRODES ACCORDING TO ITS ASSIGNED CODE WORD

812 — TRANSMITTING THE TRANSMIT SIGNALS

814 — RECEIVING A FIRST PORTION OF A RECEIVE SIGNAL, FOR RESPECTIVE ONES OF RECEIVE ELECTRODES, INDICATIVE OF THE RESPECTIVE CAPACITANCES BETWEEN THE RECEIVE ELECTRODE AND RESPECTIVE ONES OF TRANSMIT ELECTRODES OF THE FIRST SUBSET OF TRANSMIT ELECTRODES

816 — DECODING THE FIRST PORTION OF THE RECEIVE SIGNAL FOR RESPECTIVE ONES OF RECEIVE ELECTRODES USING THE FIRST PORTIONS OF THE FIRST SUBSET OF CODE WORDS

818 — COMPUTING TOUCH POSITION ESTIMATES FOR THE FIRST SUBSET OF TRANSMIT ELECTRODES BASED ON THE DECODED FIRST PORTIONS OF THE RECEIVE SIGNALS

FIG. 8

DECODING TOUCH DATA BASED ON A CODE WORD PORTION

CROSS-REFERENCE TO RELATED APPLICATIONS

This application claims priority to U.S. Provisional Patent Application No. 63/461,013, filed Apr. 21, 2023, which is hereby incorporated by reference in its entirety as if fully set forth herein.

TECHNICAL FIELD

The present disclosure relates to code-division multiplexing in capacitive touch sensing devices, in particular, decoding code-division multiplexed receive data based on code word portions to estimate a touch position in a capacitive touch sensing device.

BACKGROUND

Code-Division Multiplexing (CDM) is a spread spectrum technique which allows multiple usage of the same channel. In spread spectrum implementations of capacitive touch sensing devices, a respective signal is given a code word. Signal data is available on a shared channel. A respective signal has a unique code word assigned to it called a chip sequence or orthogonal sequence, because the code words comprise symbols or "chips". Knowing the code words, the receiver can distinguish the different signals. The code words are comprised of +1 or −1. Respective code words have L chips, where L also is the maximum number of orthogonal signals. Two code words are orthogonal when their dot product yields zero (0). The dot product of only the first elements of such two code words usually is non-zero. That is, code word portions often are non-orthogonal to each other.

For some applications, however, it is of interest to obtain an estimate (of the transmitted information, or the channel gain before a full code word is received and processed. Such applications, for example, include capacitive touch sensing applications, which have relatively fast output report rates.

In particular, human interface devices (HID) using capacitive touch sensing have relatively fast output report rates. Capacitive touch sensing devices comprise sensor electrodes functioning as antenna that are often formed in layers of conductive material, e.g. stripes of copper of printed circuit board layer (PCB). These electrodes are electrically connected to a touch detection unit, for example, on the same PCB to form a compact unit. The touch detection unit's measurement value, among others, depends on the position of a target object (finger/band) in the sensor electrode's vicinity which influences the capacitive coupling between electrode and target, yielding a target measurement signal depending on the distortion of the alternating electric field. Touch sensing technology for 2-dimensional touch detection often uses a signal deviation matrix over Tx-Rx nodes (i.e., in (x,y)) to identify positions being touched by a user's finger, for example. A touch screen may, for example, have a signal deviation 16×16 matrix of Tx-Rx nodes having Tx electrodes (m=0, 1, 2, . . . , 15) and Rx electrodes (n=0, 1, 2, . . . , 15). The code words of the Tx electrodes (m) are transmitted, receive signals of Rx electrodes (n) are received, and the information for electrode nodes (n,m) are decoded. When using CDM, decoding is possible only after receiving the receive signal in full, i.e., when containing information from the entire transmitted code words. For some touch screen applications, however, it is of interest to obtain an estimate (of the transmitted information, or complex channel gain) before the receive signals are received in full and processed.

There is a need for code-division multiplexing touch sensing schemes using a spread-spectrum technique that estimates the touch positions prior to receipt of the full receive signals.

SUMMARY OF THE INVENTION

According to aspects, there is provided a code-division multiplexing touch sensing scheme using a spread-spectrum technique that estimates touch positions prior to receipt of the full receive signals.

An aspect provides a method comprising: providing a capacitive touch sensing system comprising transmit electrodes and receive electrodes positioned to have mutual capacitances between transmit electrodes and receiver electrodes at electrode intersections called nodes, wherein the capacitance at respective ones of nodes deviates when touched; identifying a first and a second subset of transmit electrodes based on a prior touch position estimate; assigning code words from a first subset of code words to respective ones of transmit electrodes of the first set of transmit electrodes, wherein respective ones of code words are a complete code word having a first code word portion and a second code word portion; assigning code words from a second subset of code words to respective ones of transmit electrodes of the second set of transmit electrodes, wherein respective ones of code words are a complete code word having a first code word portion and a second code word portion; generating a transmit signal for respective ones of transmit electrodes according to its assigned code word; transmitting the transmit signals; receiving a first portion of a receive signal, for respective ones of receive electrodes, indicative of the respective capacitances between the receive electrode and respective ones of transmit electrodes; decoding the first portion of the receive signal for respective ones of receive electrodes using the first portions of the first subset of code words; and computing touch position estimates for the first subset of transmit electrodes based on the decoded first portions of the receive signals.

According to an aspect, there is provided a system comprising: a capacitive touch sensing system comprising transmit electrodes and receive electrodes positioned to have mutual capacitances between transmit electrodes and receive electrodes at electrode intersections called nodes, wherein the capacitance at respective ones of nodes deviates when touched; a processor; and a machine readable storage medium storing instructions, which when executed by the processor, cause the system to: identify a first and a second subset of transmit electrodes based on a prior touch position estimate; assign code words from a first subset of code words to respective ones of transmit electrodes of the first set of transmit electrodes, wherein respective ones of code words are a complete code word having a first code word portion and a second code word portion; assign code words from a second subset of code words to respective ones of transmit electrodes of the second set of transmit electrodes, wherein respective ones of code words are a complete code word having a first code word portion and a second code word portion; generate a transmit signal for respective ones of transmit electrodes of the first subset of transmit electrodes according to its assigned code word; transmit the transmit signals; receive a first portion of a receive signal, for respective ones of receive electrodes, indicative of the respective capacitances between the receive electrode and respective ones of transmit electrodes; decode the first portion of the receive signal for respective ones of receive electrodes using the first portions of the first subset of code words; and compute touch position estimates for the first subset of transmit electrodes based on the decoded first portions of the receive signals.

BRIEF DESCRIPTION OF THE DRAWINGS

The figures illustrate examples of systems and methods of capacitive touch sensing using code-division multiplexing.

FIG. 8 shows a method comprising assigning code words to transmit electrodes, decoding received signals with code words, and estimating a current touch position.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

Aspects provide code-division multiplexing (CDM) touch sensing schemes implementing a spread-spectrum technique to decode partial CDM receive data based on parts of code words to estimate touch positions before the receive signals for the entire multiplexed code words are received and decoded with a complete code word or a complete set of code words. Code word portions of respective ones of the code words may be compiled into a Hadamard matrix, wherein respective ones of code word portions comprise respective ones of rows of the Hadamard matrix.

Where the approximate location or locations of a finger or fingers touching a capacitive sensing system's touch surface are known, a subset of a set of orthogonal code words may be assigned to the touched Tx electrodes. The code words in the subset assigned to the touched Tx electrodes begin with sub-code words orthogonal to each other. At the receiver side, de-spreading and unambiguous touch detection may happen after receiving data for the sub-code words orthogonal to each other in the subset assigned to the touched Tx electrodes, without waiting until the full code words of data has been received.

Figure 1:
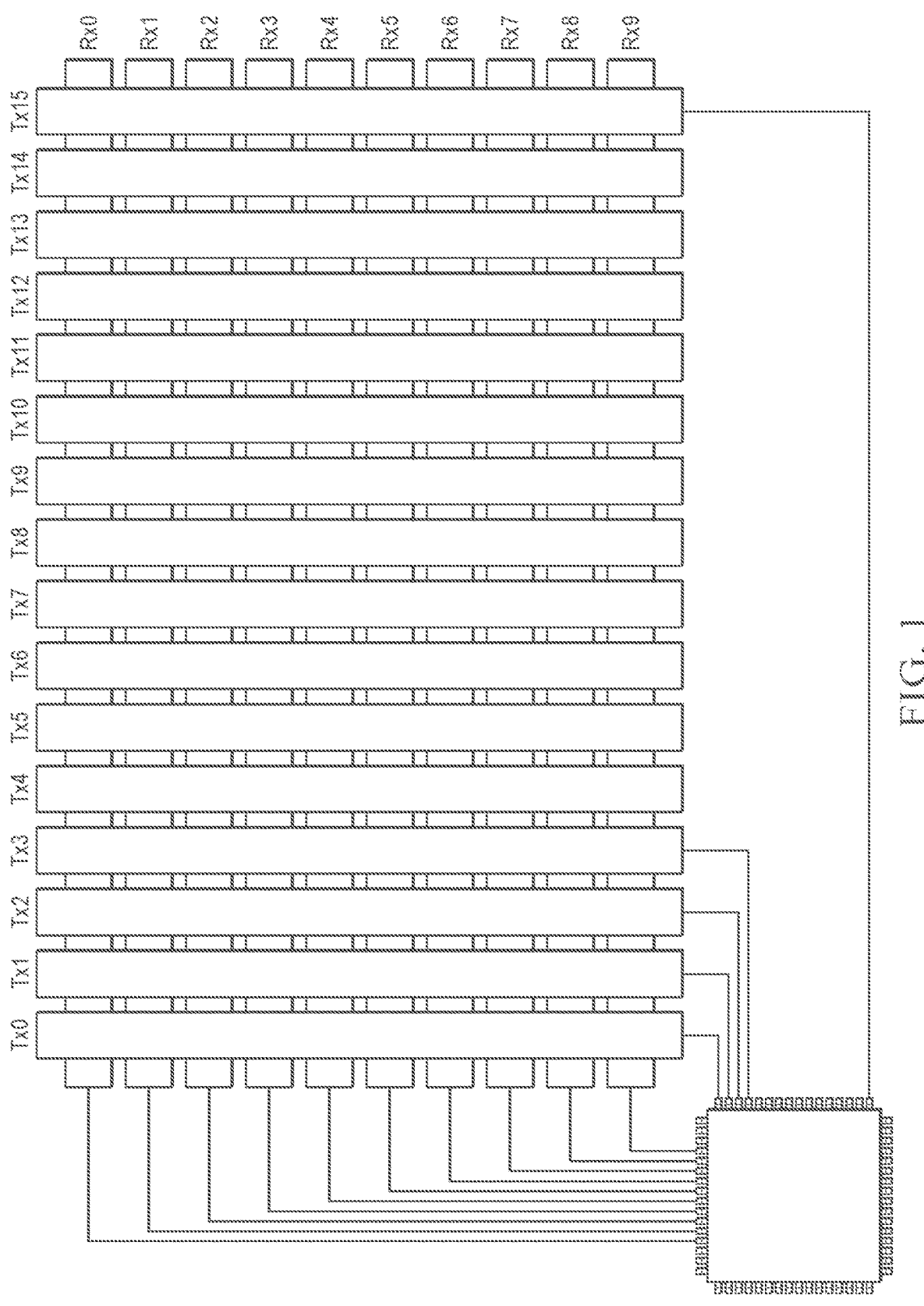
FIG. 1 shows a sensor layout with ten receive electrodes RX0, . . . , Rx9 and sixteen transmit electrodes Tx0, . . . , Tx15.

FIG. 1 shows a schematic view of a mutual-capacitance touch detection system. This touch detection system comprises a set of parallel transmit electrodes and a set of parallel receive electrodes positioned orthogonal to the set of parallel transmit electrodes in a two-dimensional (x,y) plane. A Tx-Rx electrode intersection, crossing, or 'node' is located at the intersection of a transmit electrode and a receive electrode. FIG. 1 shows a mutual-capacitance touch detection system having a 16×10 array of Tx-Rx electrode nodes. In the touch detection system, measurement values change for a node when a finger is touching a touch surface of this (x,y) plane at the node. The measurement value for a Tx-Rx electrode node is dominated by the mutual-capacitance between the respective electrodes, which is affected by a finger touching this node. When a finger touches the node, the measurement value change of the node is a signal deviation because the capacitance at the node changes when the node is touched. The term touching, as used herein, is not meant to be limited to physical contact, and is meant to include proximity sufficient to cause significant change of the capacitance at the node which can be detected as a signal deviation.

A receive signal may be observed for respective ones of the receive electrodes, wherein the receive signal is indicative of the respective capacitances between the receive electrode and respective ones of the transmit electrodes. Because a single receive electrode (for example, Rx2) receives transmit signals from multiple transmit electrodes (Tx0 through Tx15), the transmit signals may be independently deciphered by assigning a complete code word (for example, a 16 chip binary code word) to respective ones of the transmit electrodes. The assigned code words may be the rows of a size 16 Hadamard matrix. The receive signal may be decoded to identify the transmit signal of respective ones of the transmit electrodes by its complete assigned code word. For the mutual-capacitance touch detection system shown in FIG. 1, the receive signals of respective ones of the receive electrodes (Rx0 through Rx9) may be separately decoded to identify the transmit signal of respective ones of the transmit electrodes (Tx0 through Tx15) by its complete assigned code word so that all transmit signals are deciphered to identify deviations of the transmit signals at nodes being "touched." A signal deviation matrix over the 16×10 array of Tx-Rx electrode nodes (i.e., in (x,y)) may be derived from the decoded receive signals. Touch positions of the two-dimensional (x,y) plane may then be estimated for a point in time at which the receive signals are observed. U.S. Pat. No. 9,927,933 discloses a system having a gesture detection device with a plurality of input channels and an output channel which uses an alternating electric near field generated through at least one transmission electrode coupled with the output channel, wherein some of the input channels are coupled with receiving electrodes of the gesture detection device. The entire disclosure of U.S. Pat. No. 9,927,933 is incorporated herein by reference for all purposes.

Parts of a signal deviation matrix over the 16×10 array of Tx-Rx electrode nodes (i.e., in (x,y)), may also be derived in less time than it takes to transmit complete code words. For example, parts of a signal deviation matrix may be derived after receiving only eight chips of the receive signal, before receiving all sixteen chips of the receive signals containing complete code words. First, a subset, $T_{subset}$, of transmit electrodes are identified whose signals are affected by fingers touching at any receive electrode (signal deviation) at a previous point in time. Next, eight transmit electrodes, including those identified as being affected by fingers at the previous point in time, are assigned respective ones of the first eight rows of the size sixteen Hadamard matrix $H_{16}$ in FIG. 2C as respective code words, where Hadamard matrix H16 in FIG. 2C is constructed from four Hadamard matrices H8 as shown in FIG. 2D and as explained further below. While FIGS. 2B-2D show a default assignment of code words, an adapted code-word-to-TX-electrode mapping may be based on the prior touch estimate so that the subset, $T_{subset}$, of transmit electrodes being touched may be reassigned the first eight code words (first eight rows of the size 16 Hadamard matrix $H_{16}$). Then, the remaining eight rows of the size 16 Hadamard matrix $H_{16}$ are assigned to the remaining transmit electrodes outside the subset of transmit electrodes $T_{subset}$, i.e. the transmit electrodes not being touched. The transmission system is then run to transmit the transmit signals, i.e., code words, for all sixteen transmit electrodes. After reception of the first eight chips of the receive signal, the detection system performs the CDM de-spreading operation with the size eight Hadamard matrix Hg to derive a partial signal deviation matrix over the 16×10 array of Tx-Rx electrode nodes (i.e., in (x,y)). This estimate may be called a 50% estimate because it is based on code word portions that are 50% of the complete code words (eight chips of the complete sixteen chips) in an $H_8$ Hadamard matrix, and the signal deviation matrix can only be computed and updated for the transmit electrodes in $T_{subset}$—the rest of the signal deviation matrix is assumed to be unchanged compared to a previous, 100% (full) estimate. For a 100% (full) estimate, the receiving signal comprises both a first portion of the code words (first eight chips) and a second portion of the code words (second eight chips) so that complete code words (sixteen chips) are received, and the complete receive signal may be decoded for the receive electrodes using the complete code words.

FIGS. 2A-2D illustrate providing a capacitive touch sensing system comprising transmit electrodes and receive electrodes positioned to have mutual capacitances between transmit electrodes and receive electrodes at electrode intersections called nodes (see FIG. 1), wherein the capacitance at respective ones of nodes deviates when touched; and performing a touch position estimate by: identifying a first and a second subset of transmit electrodes based on a prior touch position estimate; assigning code words (default or adapted) from a first subset of code words to respective ones of transmit electrodes of the first set of transmit electrodes, wherein respective ones of code words from the first subset of code words are a complete code word having a first code word portion and a second code word portion; assigning code words (default or adapted) from a second subset of code words to respective ones of transmit electrodes of the second set of transmit electrodes, wherein respective ones of code words from the second subset of code words are a complete code word having a first code word portion and a second code word portion; generating a transmit signal for respective ones of transmit electrodes according to its assigned code word; transmitting the transmit signals; receiving a first portion of a receive signal, for respective ones of receive electrodes, indicative of the respective capacitances between the receive electrode and respective ones of transmit electrodes; decoding the first portion of the receive signal for respective ones of receive electrodes using the first portions of the first subset of code words; and computing a touch position estimate for the first subset of transmit electrodes based on the decoded first portions of the receive signals.

A signal deviation matrix over the 16×10 array of Tx-Rx electrode nodes (i.e., in (x,y)), may further be derived after reception of all sixteen chips. The detection system performs the de-spreading operation with the full size sixteen Hadamard matrix $H_{16}$ using the complete code words for all transmit electrodes. The signal deviation matrix thereby obtained may be an estimate with improved signal-to-noise ratio (SNR) compared to the 50% estimate. This second estimate may be called a 100% estimate because it is based on the complete code words (sixteen chips) in a $H_{16}$ Hadamard matrix.

Arrays of Tx-Rx electrode nodes may be of any size and any aspect ratio. Code words may take any form, in particular, they may be any spreading sequence. Chip values may take values other than +1 and −1, for example, +2 and −2. A Hadamard matrix or any other mathematical structure may be used to derive an estimated signal deviation matrix of an array of Tx-Rx electrode nodes.

A signal deviation matrix and detection system that makes alternating 50% and 100% report estimates may provide an increase of the report rate of the touch position estimates. As explained with reference to FIG. 1, the report rate of the touch position estimates may be doubled by making estimates based on the first eight chips of the eight code words of the first group of transmit electrodes (50% estimate) in addition to making estimates based on the full sixteen chips of the sixteen code words of the combined first and second groups of transmit electrodes (100% estimate). Estimates in any communication/sensing system, including an estimate computed after 100% of the data are available, may be wrong because estimates are based on assumptions, and prone to measurement noise and other variables.

In some applications, report rates as high as 200 Hz are desirable. By alternating between 50% estimates and 100% estimates, report rates as high as 200 Hz may be obtained.

For use as a CDM sensing system, respective ones of the transmit electrodes are assigned a spreading sequence or code word from a set of orthogonal spreading sequences or code words. As used herein, default assigning or mapping means initial or original mapping of code words to transmit electrodes without using a prior touch estimate to inform the assignment or mapping. As used herein, adaptive assigning or mapping of code words means subsequently assigning or mapping code words to transmit electrodes based on a prior touch estimate. An adapted mapping may map a first set of code words to any transmit electrodes estimated to have been touched or assumed to have been touched by a prior touch estimate.

For the mutual-capacitance touch detection system shown in FIG. 1, there are sixteen transmit (Tx) electrodes Tx0, Tx1, . . . , Tx15. FIG. 2D shows a default code-word-to-TX (S2T) mapping of code words to the transmit electrodes, wherein the transmit electrodes are numbered Tx0 through Tx15 from top to bottom. The set of sequences or code words may be the rows of the size 16 Hadamard matrix $$H_{16} = \begin{bmatrix} H_8 & H_8 \\ H_8 & -H_8 \end{bmatrix}$$

which can be recursively computed by $$H_{2^k} = \begin{bmatrix} H_{2^{k-1}} & H_{2^{k-1}} \\ H_{2^{k-1}} & -H_{2^{k-1}} \end{bmatrix}$$

with $H_{16}=1$ using Sylvester's construction. Row q of $H_{16}$, $q \in \{0,1, \ldots, 15\}$, denoted by $$c_q^{(16)},$$

is assigned to Tx m, $m \in \{0,1, \ldots, 15\}$. Generally, the decoding ('de-spreading') of a receive sequence or code word when employing code words of length sixteen chips, is completed after having received all sixteen chips of the code word. However, according to an aspect providing a special construction of the size 16 Hadamard matrix $H_{16}$, the first eight received chips may be decoded using the size 8 Hadamard matrix $H_8$, which may yield an ambiguous result because the same encoding size 8 Hadamard matrix Hg is used for both the first subset $T_{subset}$ of transmit electrodes (Tx0-Tx7) and the remaining transmit electrodes outside the subset $T_{subset}$ (Tx8-Tx15). Ambiguous results are described more fully below.

Figure 2A:
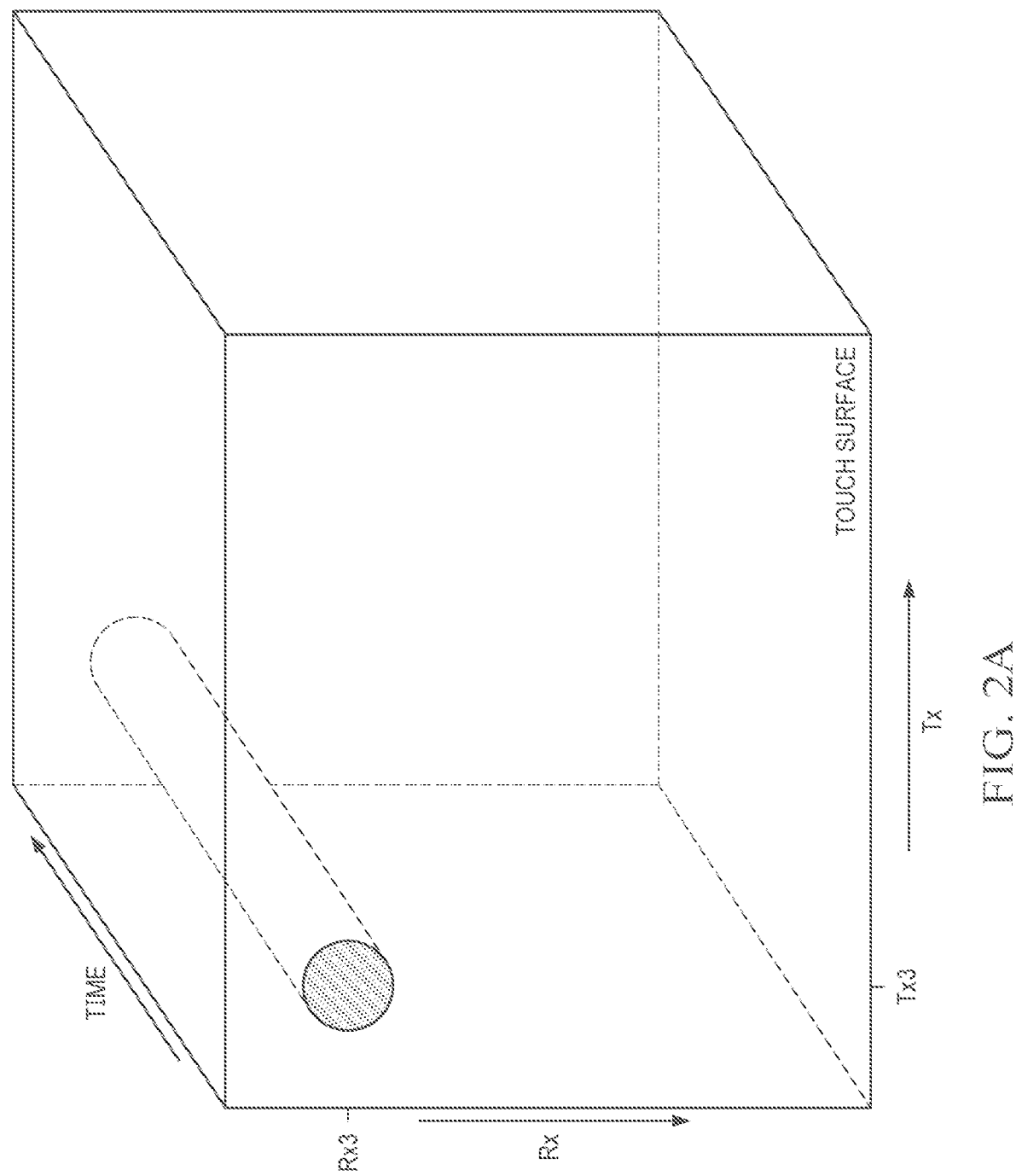
FIG. 2A shows a touch surface and time axis, illustrating a single finger touch on the electrode crossing of Tx3, Rx3 with a constant position over time.
Figure 2B:
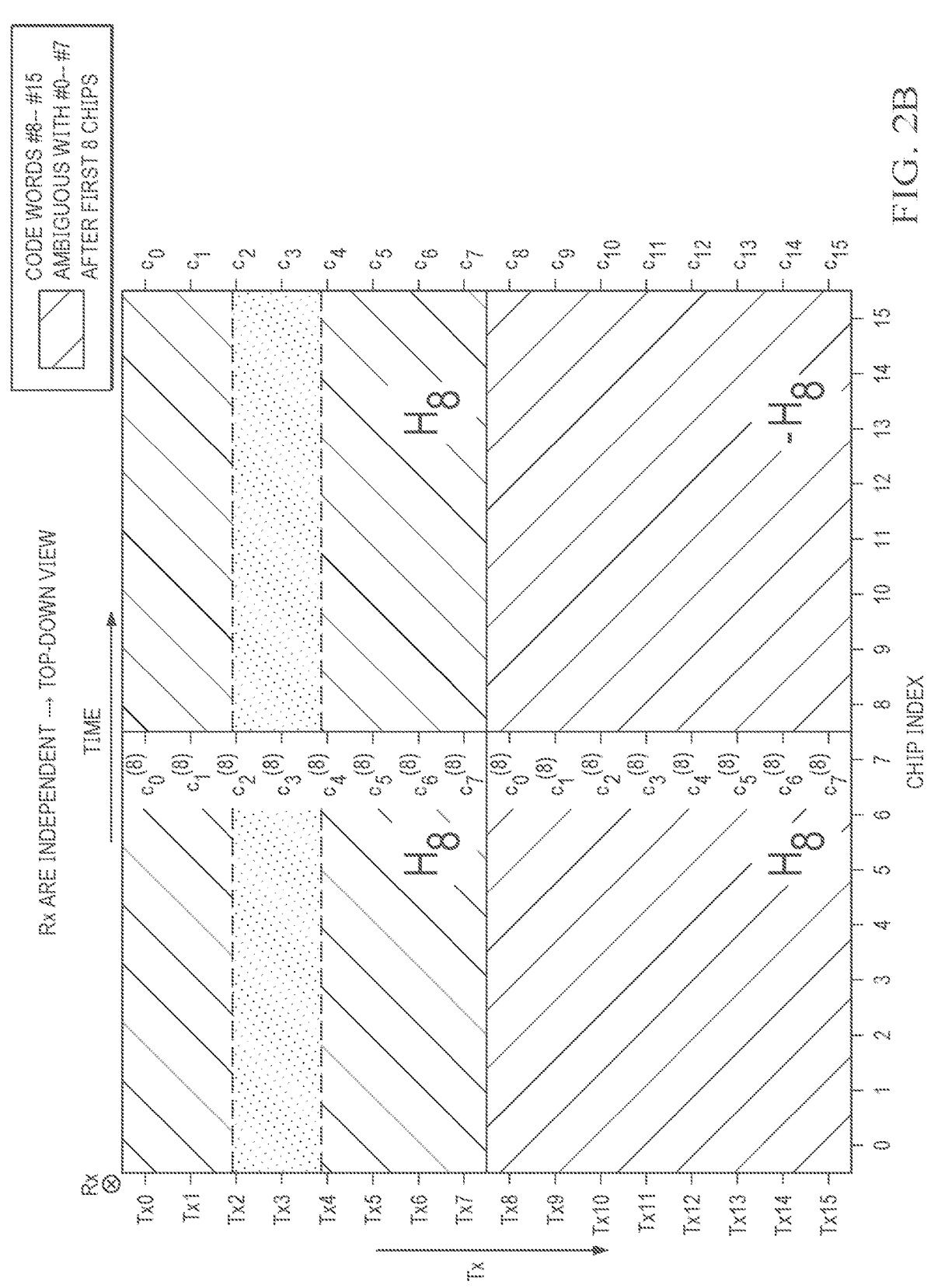
FIG. 2B shows a default code-word-to-TX (S2T) mapping for the touch surface and single finger touch shown in FIG. 2A.
Figure 2C:
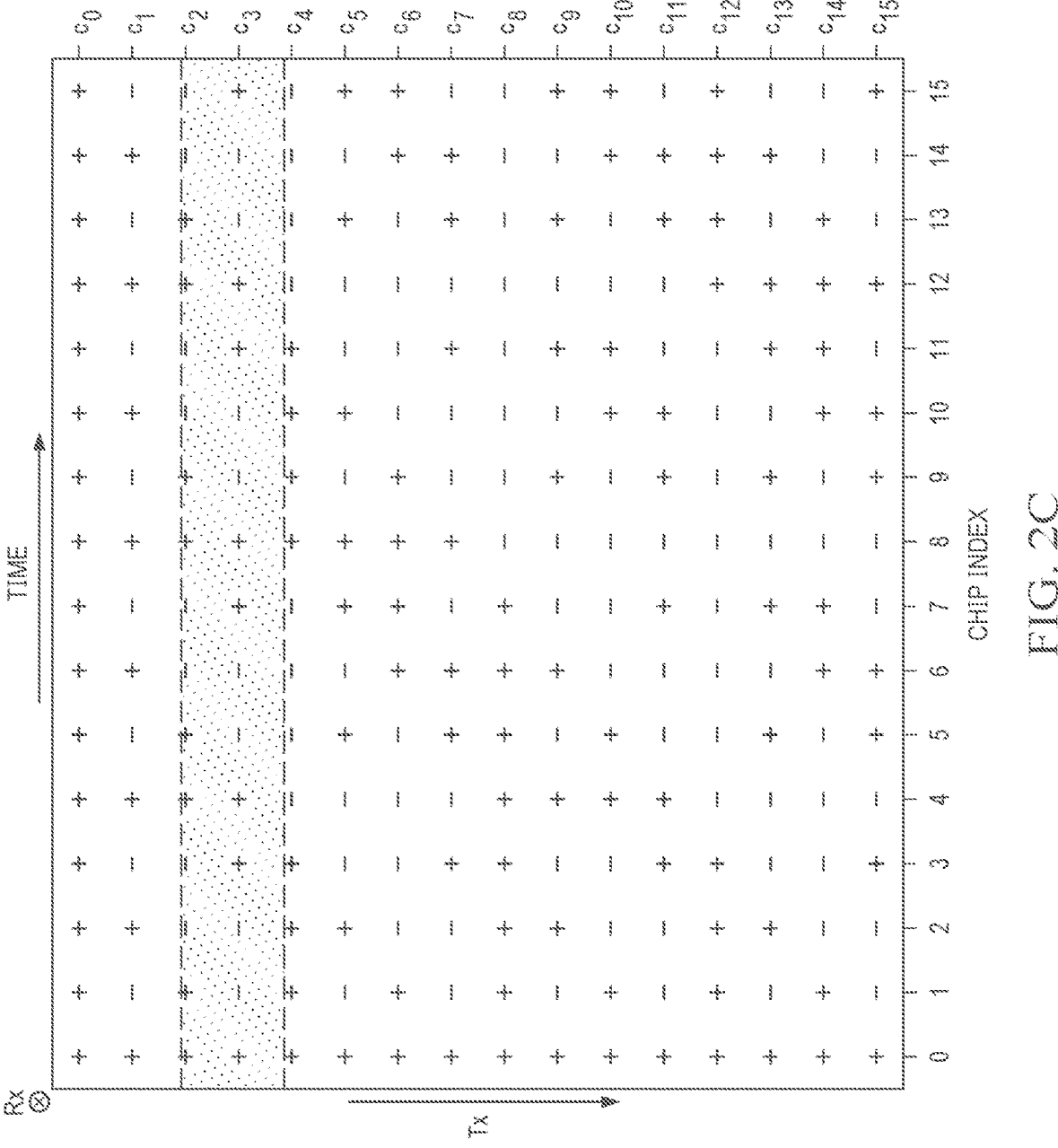
FIG. 2C shows the code-word-to-Tx mapping as shown in FIG. 2B while illustrating the code words' chip values.
Figure 2D:
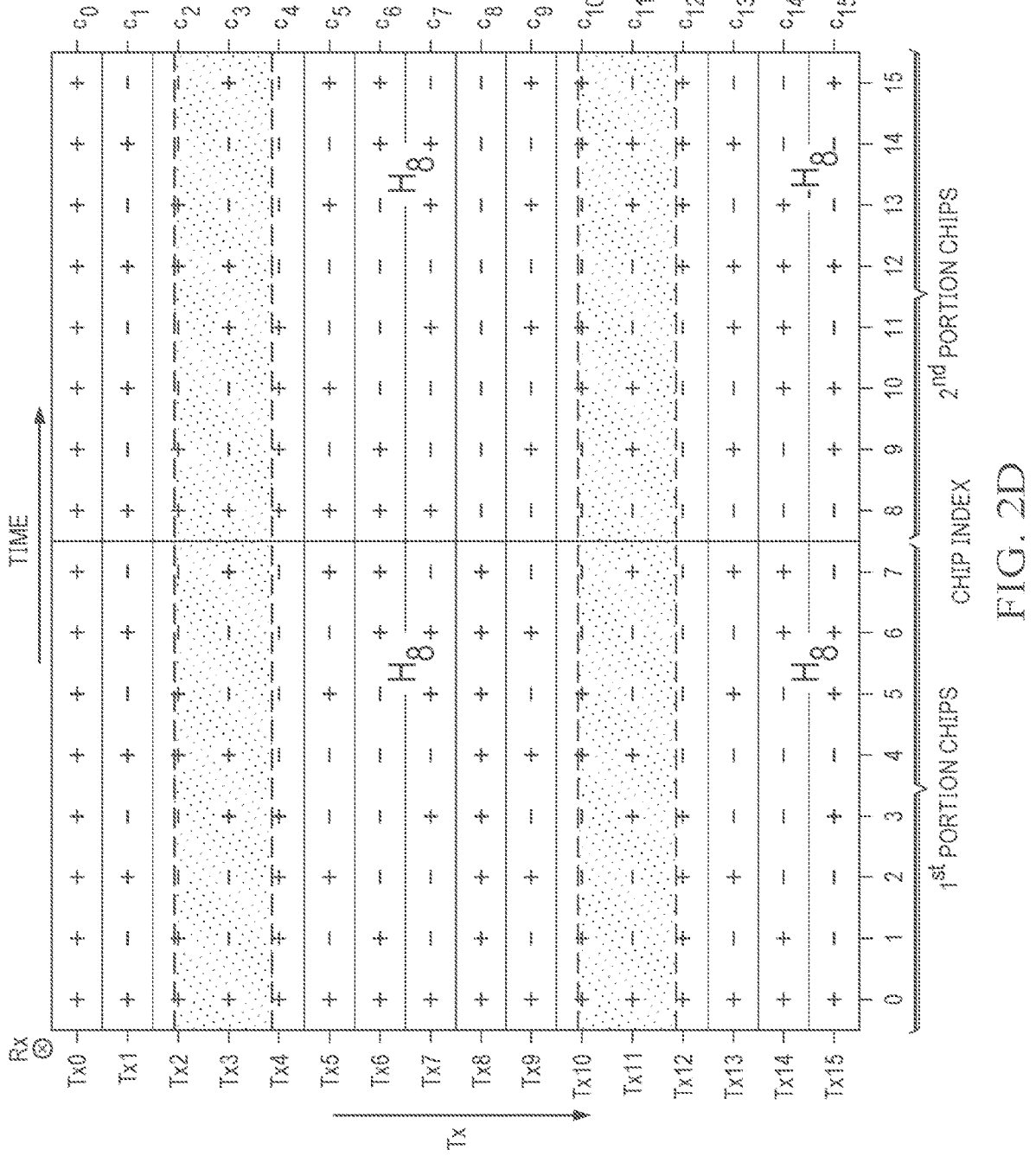
FIG. 2D shows the code-word-to-Tx mapping and chip values as shown in FIG. 2C highlighting the construction of a default code-word-to-Tx mapping matrix, wherein a Hadamard matrix consists of four quadrants with smaller Hadamard matrices.

FIG. 2A shows a touch surface and time axis, illustrating a single finger touch (shown by a circle on the plane representing a touch surface) on the electrode crossing of Tx3, Rx3 with constant position over time (shown by a cylinder extending from the plane representing a touch surface). FIG. 2B shows a default code-word-to-TX (S2T) mapping for the touch surface and single finger touch shown in FIG. 2A, wherein code words $c_0$ through $c_{15}$ are assigned to transmit electrodes Tx0 through Tx15, respectively, and respective ones of the code words has sixteen chips. In this example, a single finger is touching the touch surface on Tx3. There is no finger touching any of the other electrodes, particularly not the Tx electrodes TX8-Tx15. Consequently, as there is no change in the position of the touch, and neither a new touch, there is no influence from a finger touching Tx electrodes Tx8-Tx15 on the signal deviation, such that there is no ambiguity in the signal deviation. Touches on TX8-Tx15 may result in receive data ambiguous with receive data upon touches on Tx0-Tx7 after receipt of the first eight chips, because portions $$C_0^{(8)} - C_7^{(8)}$$

of code words $C_0$-$C_7$ are the same as portions $$C_0^{(8)} - C_7^{(8)}$$

of code words $C_8$-$C_{15}$. As used herein, the term "ambiguous" means a detection system is unable to definitively determine a touch position between two or more possible positions because there are two or more code word portions that are identical. As shown in FIGS. 2C-2D, the first eight chips of code words assigned to transmit electrodes Tx0-Tx7 are identical to the first eight chips of code words assigned to transmit electrodes Tx8-Tx15, so that the touch position is ambiguous based on encoding data solely of transmit electrodes Tx0-Tx7, because the touch position could be at either transmit electrodes Tx0-Tx7 or transmit electrodes Tx8-Tx15. Because CDM is based on a set of orthogonal code words, for this example, the rows of Hadamard matrix are of size sixteen. Two code words are orthogonal when their dot product is zero (0). Two code words are substantially orthogonal when the code words comprise a dot product less than 0.1 times the code word length. Orthogonality means that touching Tx m does not affect measurement values for other Tx m̃, where m̃≠m.

$$H_{16} = \begin{bmatrix} c_0 \\ c_1 \\ c_2 \\ \vdots \\ c_{15} \end{bmatrix} =$$

$$\begin{bmatrix} 1 & 1 & 1 & 1 & 1 & 1 & 1 & 1 & 1 & 1 & 1 & 1 & 1 & 1 & 1 & 1 \\ 1 & -1 & 1 & -1 & 1 & -1 & 1 & -1 & 1 & -1 & 1 & -1 & 1 & -1 & 1 & -1 \\ 1 & 1 & -1 & -1 & 1 & 1 & -1 & -1 & 1 & 1 & -1 & -1 & 1 & 1 & -1 & -1 \\ & & & & & & & \vdots & & & & & & & & \\ 1 & -1 & -1 & 1 & -1 & 1 & 1 & -1 & -1 & 1 & 1 & -1 & 1 & -1 & -1 & 1 \end{bmatrix}$$

A respective Tx is assigned a code word $c_i$, for example, a binary sequence from H16, where for the scalar product of two code words holds $$c_i \cdot c_j^T = \begin{cases} 16: i = j \\ 0: i \neq j \end{cases}$$

The transmit vector of Tx electrode m is:

$$s^{(m)} = c_m, m = 0, 1, \ldots, 15$$

On the Rx side, respective receive signal $r^{(n)}$ of receive electrode n is a weighted sum of the sixteen transmit signals, where the weight for a TX changes upon finger touch on this Tx. The received vector of Rx electrode n is:

$$r^{(n)} = \sum_{m=0}^{15} w^{(n,m)} \cdot s^{(m)}, n \in \{0, 1, \ldots\}$$

The decoding of electrode node (n,m) is:

$$y^{(n,m)} = r^{(n)} \cdot \left(s^{(m)}\right)^T, n \in \{0, 1, \ldots\} = 16 \cdot w^{(n,m)}$$

For the first eight chips, the code words for Tx8-Tx15 are identical to code words for Tx0-Tx7, which makes an ambiguity. The ambiguity may be resolved by decoding after receiving all sixteen chips, because the full code words of length sixteen chips are orthogonal to each other. An ambiguity may be avoided by assuming that at most Tx electrodes of the first set of Tx electrodes are being touched and the remaining TX electrodes outside the first set are not being touched, wherein this assumption may be based on a 100% estimate prior to the 50% estimate. A single touch may cover more than one transmit electrode.

FIG. 2D shows a diagram of the code words as shown in FIG. 2C, wherein the set of orthogonal code words has rows of Hadamard matrix of size sixteen. FIG. 2D is highlighting the construction of a default code-word-to-Tx mapping matrix, wherein a Hadamard matrix consists of four quadrants with smaller Hadamard matrices.

$$H_{16} = \begin{bmatrix} c_0 \\ c_1 \\ c_2 \\ \vdots \\ c_{N-1} \end{bmatrix} = \begin{bmatrix} H_8 & H_8 \\ H_8 & -H_8 \end{bmatrix}$$

As noted, there is an ambiguity for the first eight chips, because the first eight chips of the code words for Tx8-Tx15 are identical to the first eight chips of the code words for Tx0-Tx7. In particular, there is an ambiguity because a touch on Tx11 is indistinguishable from a touch on Tx3 when only given the receive signal values for the first eight chips. An ambiguity/interference may occur when touches are both on Tx0-Tx7 and Tx8-Tx15. When it is assumed, based on information from a previous point in time, that there is no touch on Tx8-Tx15, an interference can be excluded and an unambiguous measurement may be taken on Tx0-Tx7.

FIG. 2D shows a construction method for Hadamard matrices, wherein the size sixteen Hadamard matrix $H_{16}$ is recursively constructed, in four quadrants of the size sixteen Hadamard matrix, containing four copies of a size eight Hadamard matrix $H_8$, one in the bottom right quadrant being sign inverted, where the size eight Hadamard matrix $H_8$ is a set of orthogonal rows eight chips long. There are repeating patterns in this matrix because of the special construction method, namely the size sixteen Hadamard matrix $H_{16}$ is constructed from four copies of the size eight Hadamard matrix $H_8$. The size eight Hadamard matrix $H_8$, has orthogonal rows.

After eight Rx chips are received, there is ambiguity between touches on Tx #0-#7 and #8-#15 because the partial code words of Tx #0-#7 and #8-#15 are identical. For example, a touch on Tx #11 yields the same Rx signals as a touch on Tx #3. This ambiguity exists when there is a chance that there is a touch both on Tx #0-#7 and #8-#15. However, if it can be assumed there is no touch on Tx #8-#15, then a touch on Tx #0-#7 can be resolved unambiguously, or vice versa, even after receipt of only the first eight chips of the original code word's sixteen chips.

Figure 3A:
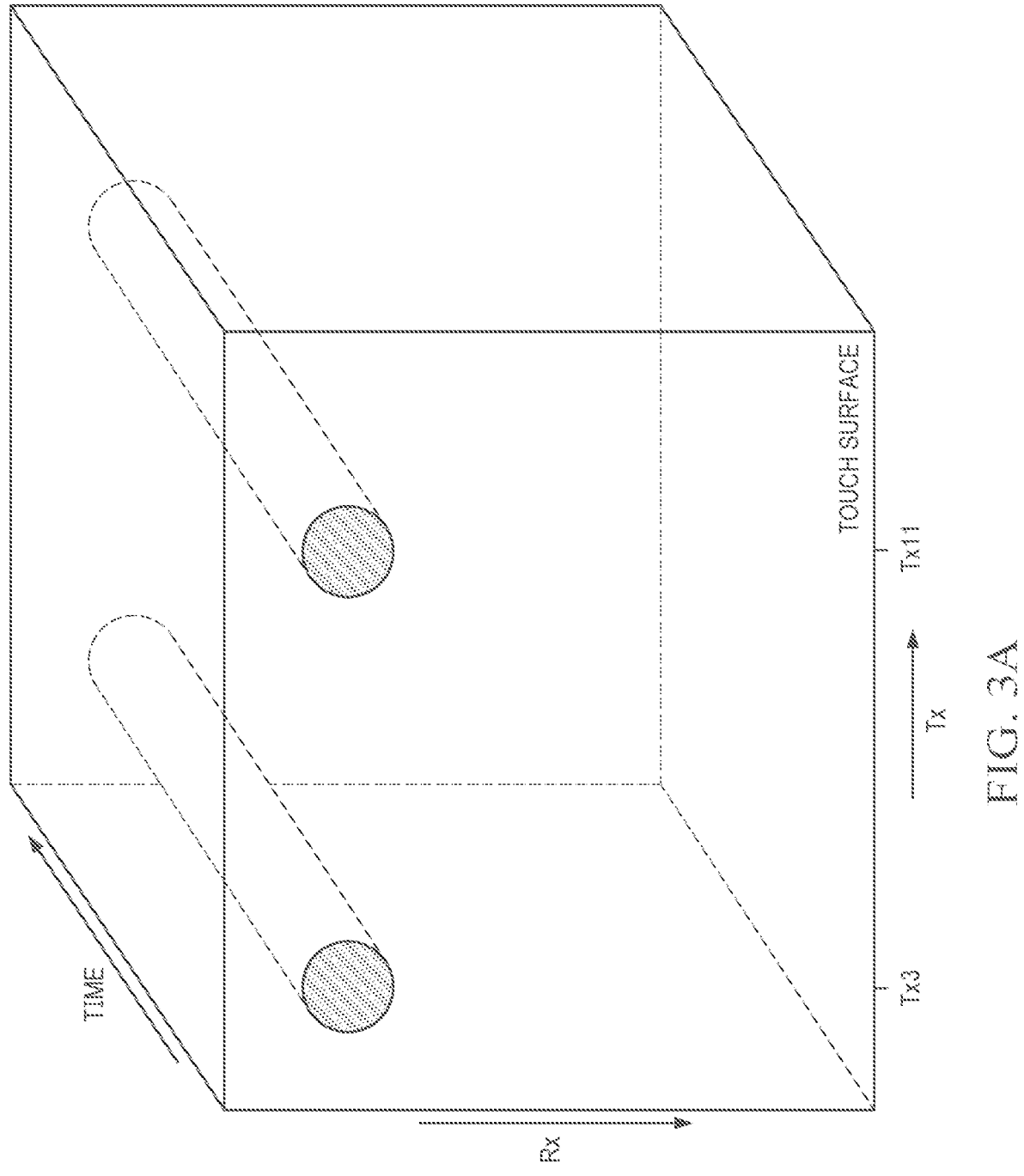
FIG. 3A shows a touch surface and time axis, illustrating a two-finger touch with constant finger positions over time.
Figure 3B:
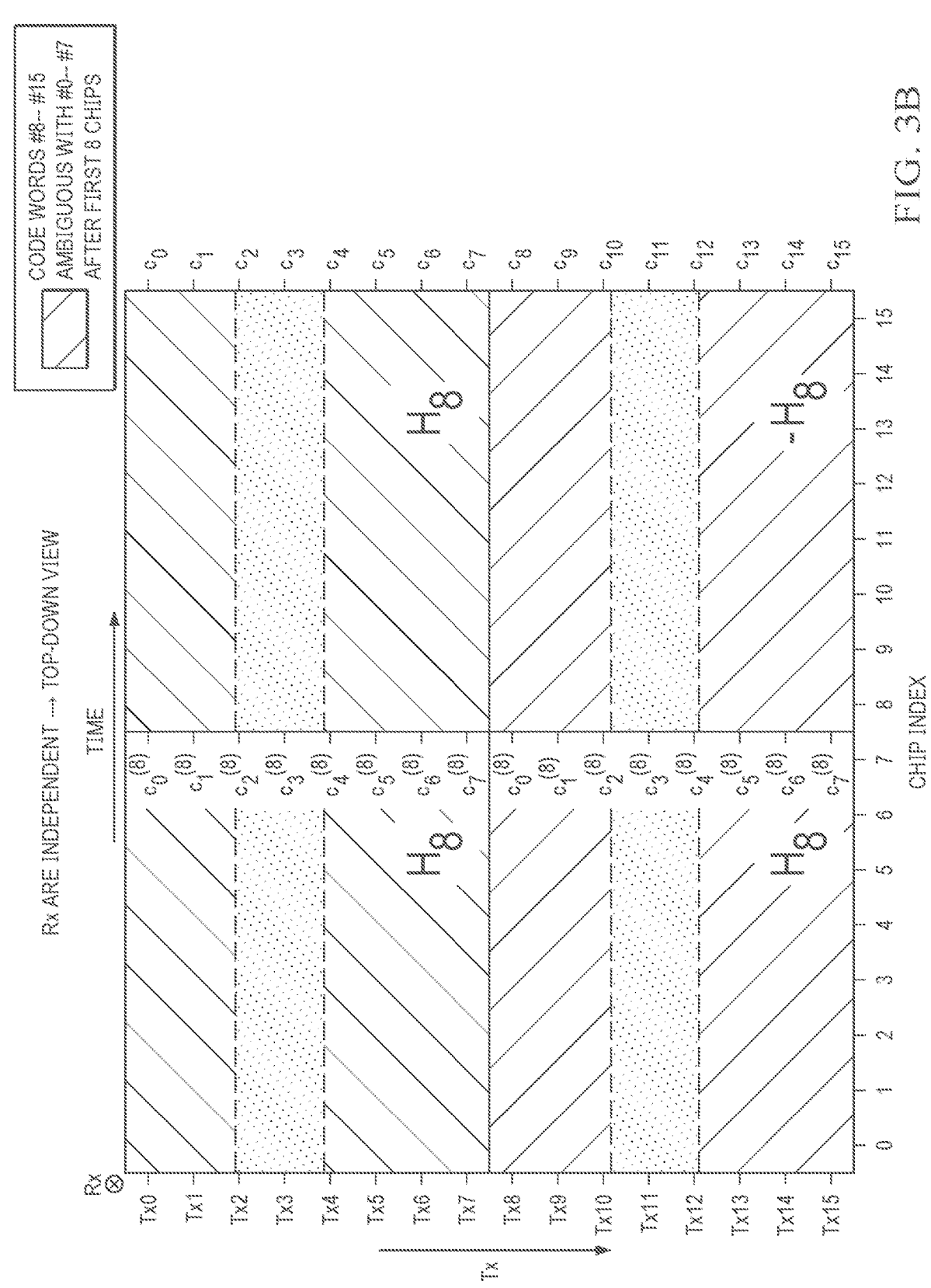
FIG. 3B shows the code-word-to-Tx mapping as shown in FIG. 2B yielding ambiguous detection after eight chips for the touch surface shown in FIG. 3A.
Figure 3C:
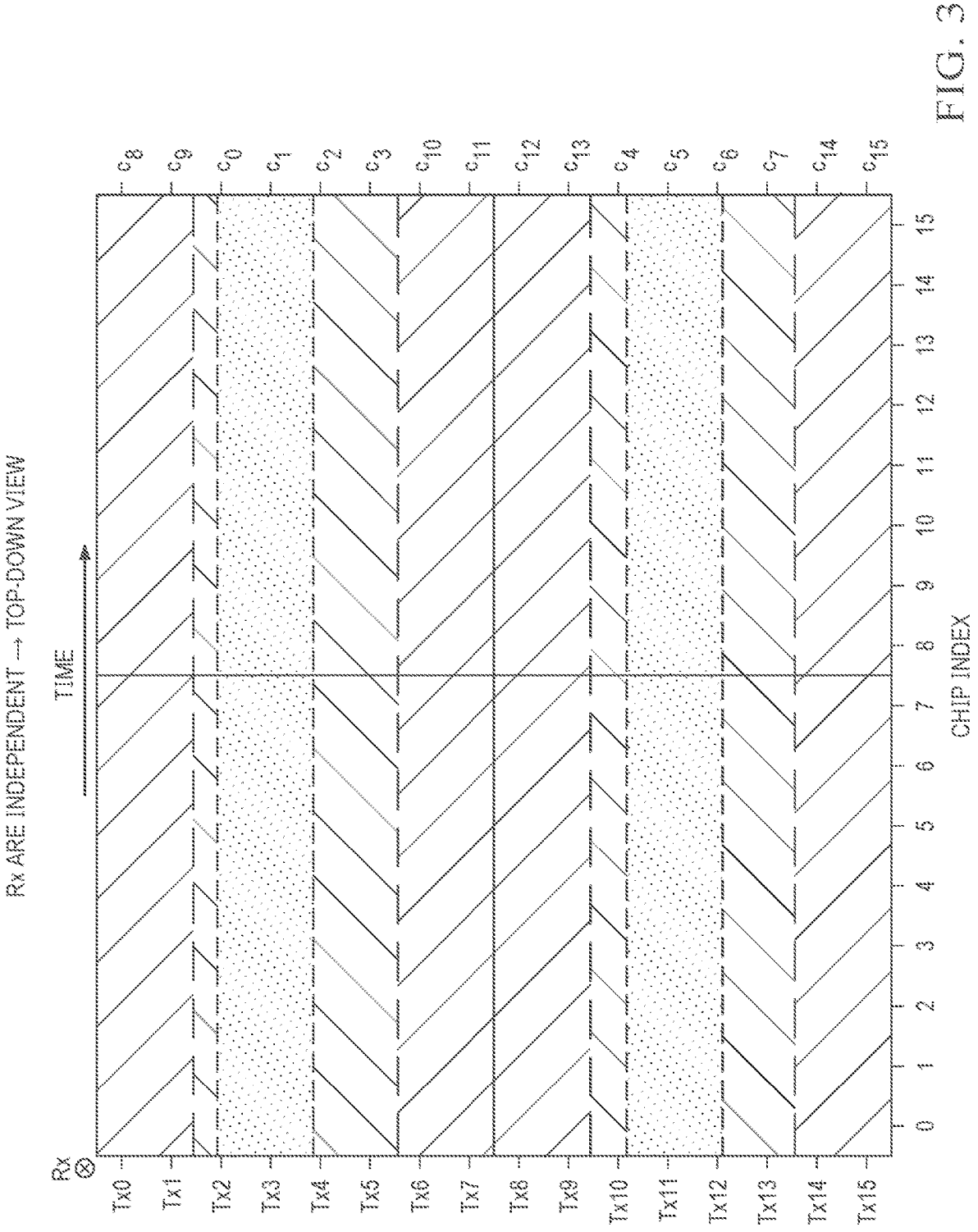
FIG. 3C shows an adapted assignment or mapping of code words to the transmit electrodes of FIGS. 3A-3B.

FIG. 3A shows a touch surface and time axis, illustrating a two-finger touch-one touch on Tx electrode #3 (Tx3) and another touch on Tx electrode #11 (Tx11). FIG. 3B shows a code-word-to-TX (S2T) mapping for the touch surface shown in FIG. 3A. In this example, a single finger is touching the touch surface on Tx3 and another single finger is touching the touch surface on Tx11. There is no finger touching any of the other electrodes. Consequently, in the event that there is no change in the position of touch, there will be an influence from a finger touching Tx electrodes Tx8-Tx15 on the signal deviation, such that there may be ambiguity in the signal deviation. Code words of Tx8-Tx15 may be ambiguous with code words of Tx0-Tx7 after receipt of the first eight chips, because the first eight chips of code words $C_0$-$C_7$ are identical to the first eight chips of code words $C_8$-$C_{15}$, see FIG. 2D. The ambiguity of FIG. 3B may be resolved by decoding after receiving all sixteen chips, because the second eight chips of code words are not identical. Alternatively, FIG. 3C shows an adapted assignment or mapping of code words to transmit electrodes, which may preclude an ambiguity of the code words when decoding after receipt of the first eight chips. Via the adapted assignment, code words $C_0$-$C_3$ are assigned to transmit electrodes Tx2-Tx5, respectively, and code words $C_4$-$C_7$ are assigned to transmit electrodes Tx10-Tx13, respectively. There is no ambiguity with this adapted assignment because the touched transmit electrodes (Tx2-Tx5 and Tx10-Tx13) are assigned code words $C_0$-$C_7$ and the remaining untouched transmit electrodes (Tx0-Tx1, Tx6-Tx9, and Tx14-Tx15) are assigned code words $C_8$-$C_{15}$.

Figure 4A:
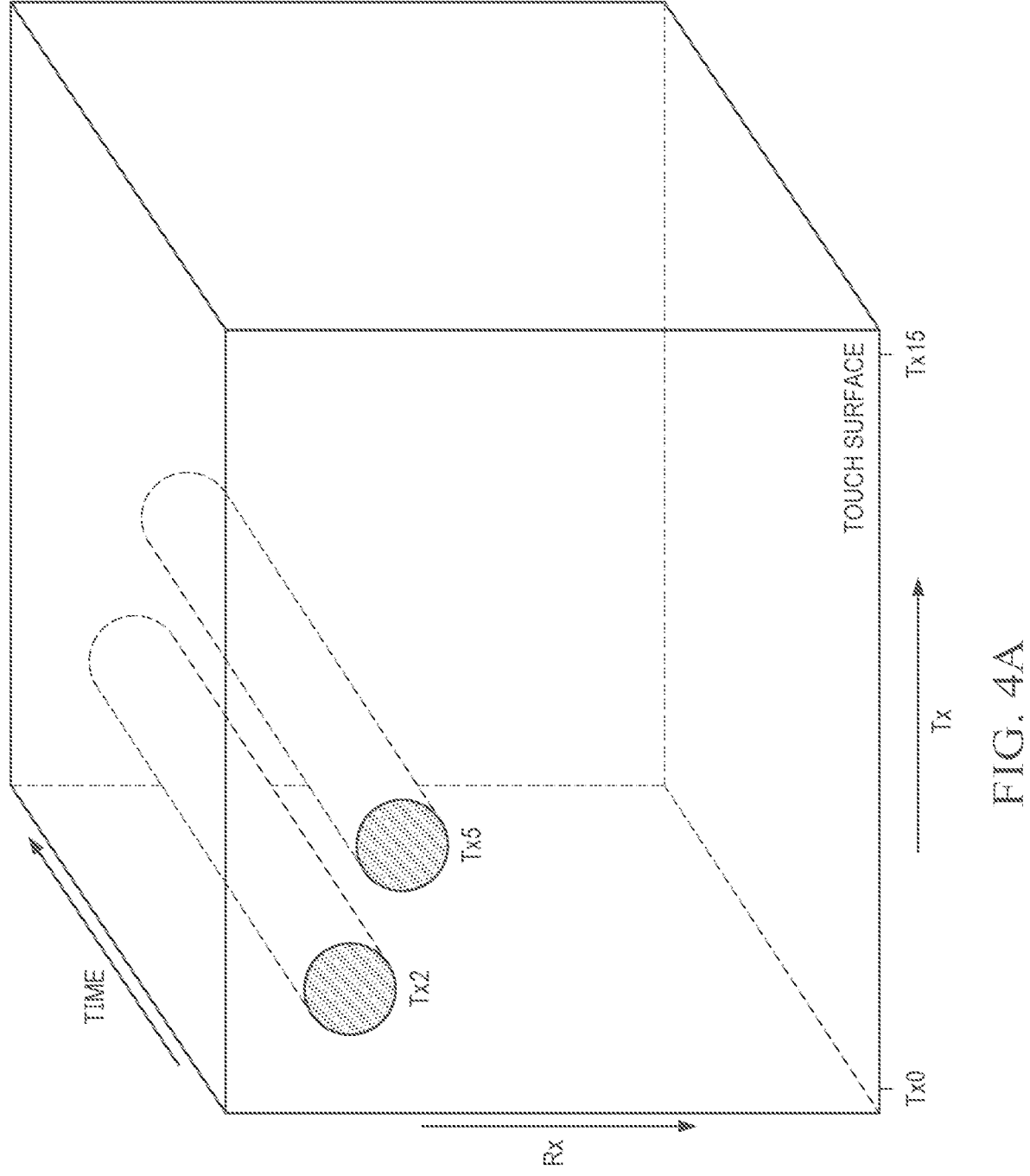
FIG. 4A shows a touch surface and time axis, illustrating a two-finger touch on Tx0-Tx7 with touch positions constant over time.
Figure 4B:
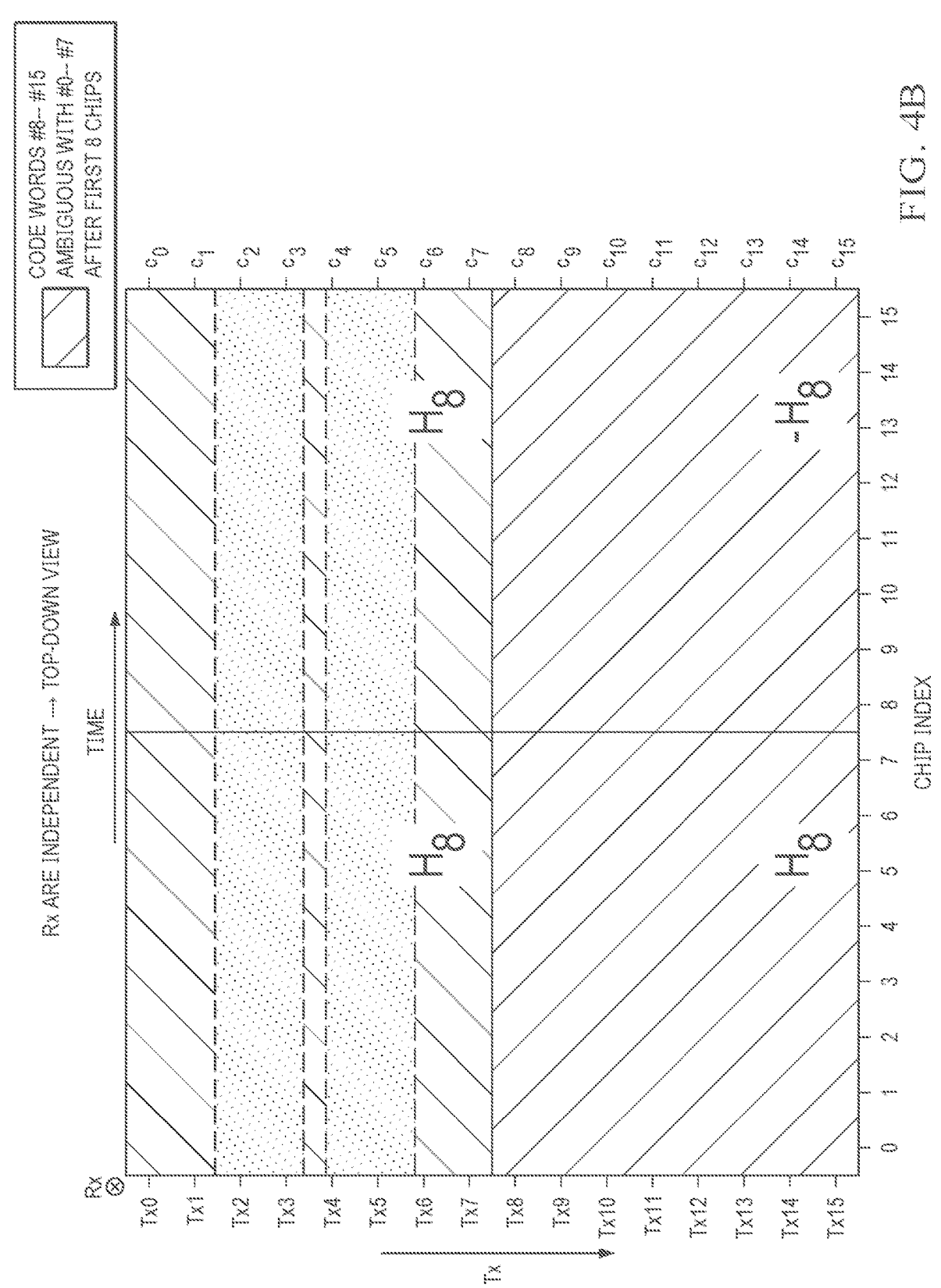
FIG. 4B shows the code-word-to-Tx mapping as shown in FIG. 2B yielding un-ambiguous detection after eight chips, for the touch surface shown in FIG. 4A.

FIG. 4A shows a touch surface and time axis, illustrating a two-finger touch on Tx0-Tx7—one touch on Tx electrode #2 (Tx2) and another touch on Tx electrode #5 (Tx5). FIG. 4B shows a code-word-to-TX (S2T) mapping for the touch surface and single finger touch at the previous point in time shown in FIG. 4A. There is no finger touching any of the other electrodes, particularly not the Tx electrodes Tx8-Tx15. Consequently, in the event that there is no change in the position of touch, there will be no influence from a finger touching Tx electrodes Tx8-Tx15 on the signal deviation, such that there is no ambiguity in the signal deviation. In this example, two-finger touches can be unambiguously resolved/detected after only eight receive chips when they are both located on Tx electrodes Tx0-Tx7. Any number of touches on the area of Tx electrodes Tx0-Tx7 can be resolved provided it is assumed that there is no touch on Tx electrodes Tx8 to Tx15. Code words for Tx8-Tx15 may be ambiguous with code words for Tx0-Tx7 after receipt of the first eight chips because these code word portions are identical. If it has been previously estimated that there are no touches on Tx8-Tx15, then the detection system may assume estimated touches, if any, will be on Tx0-Tx7, i.e. not on Tx8-Tx15.

Figure 5A:
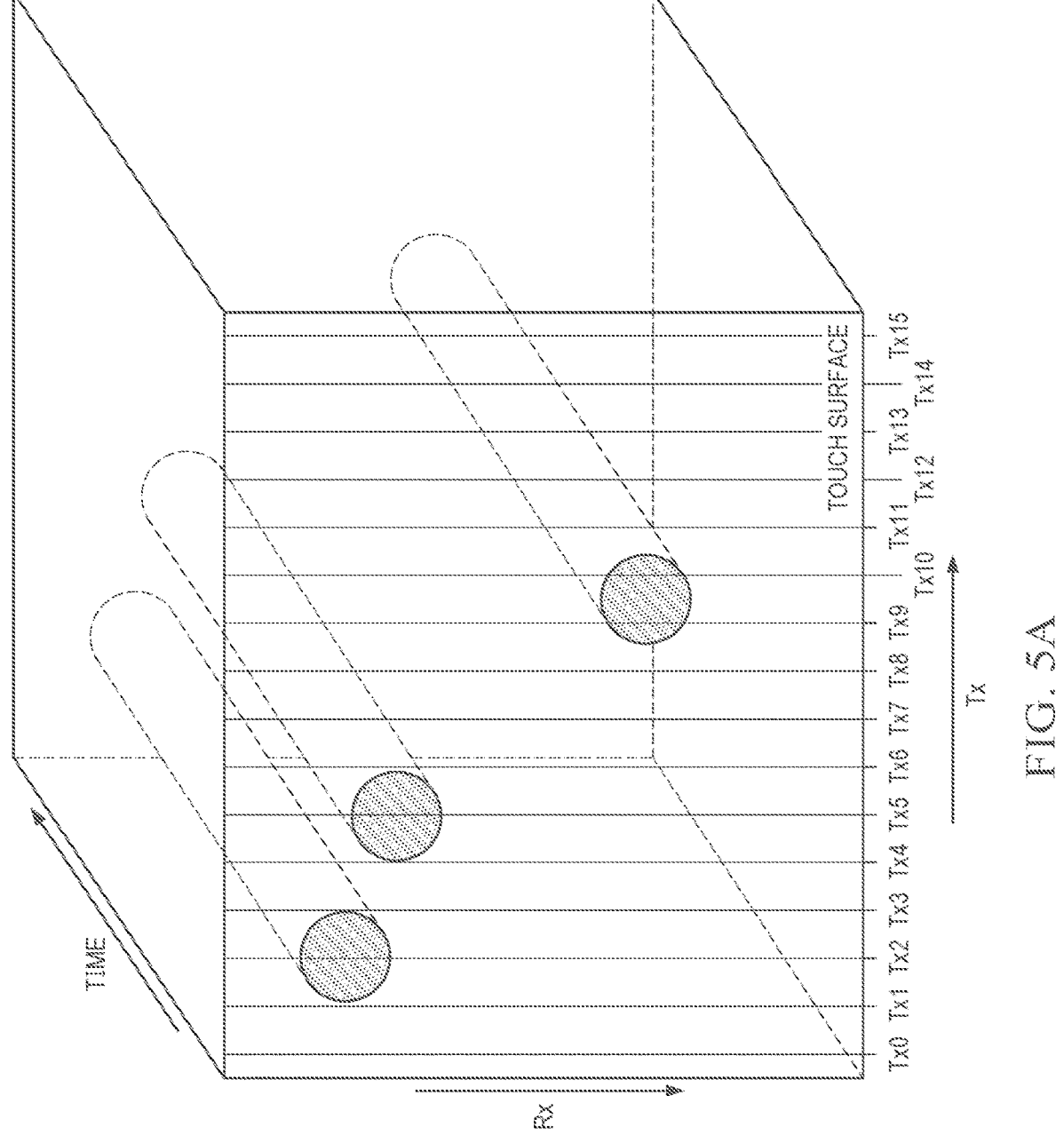
FIG. 5A shows a touch surface and time axis, illustrating a three-finger touch with constant positions over time.
Figure 5B:
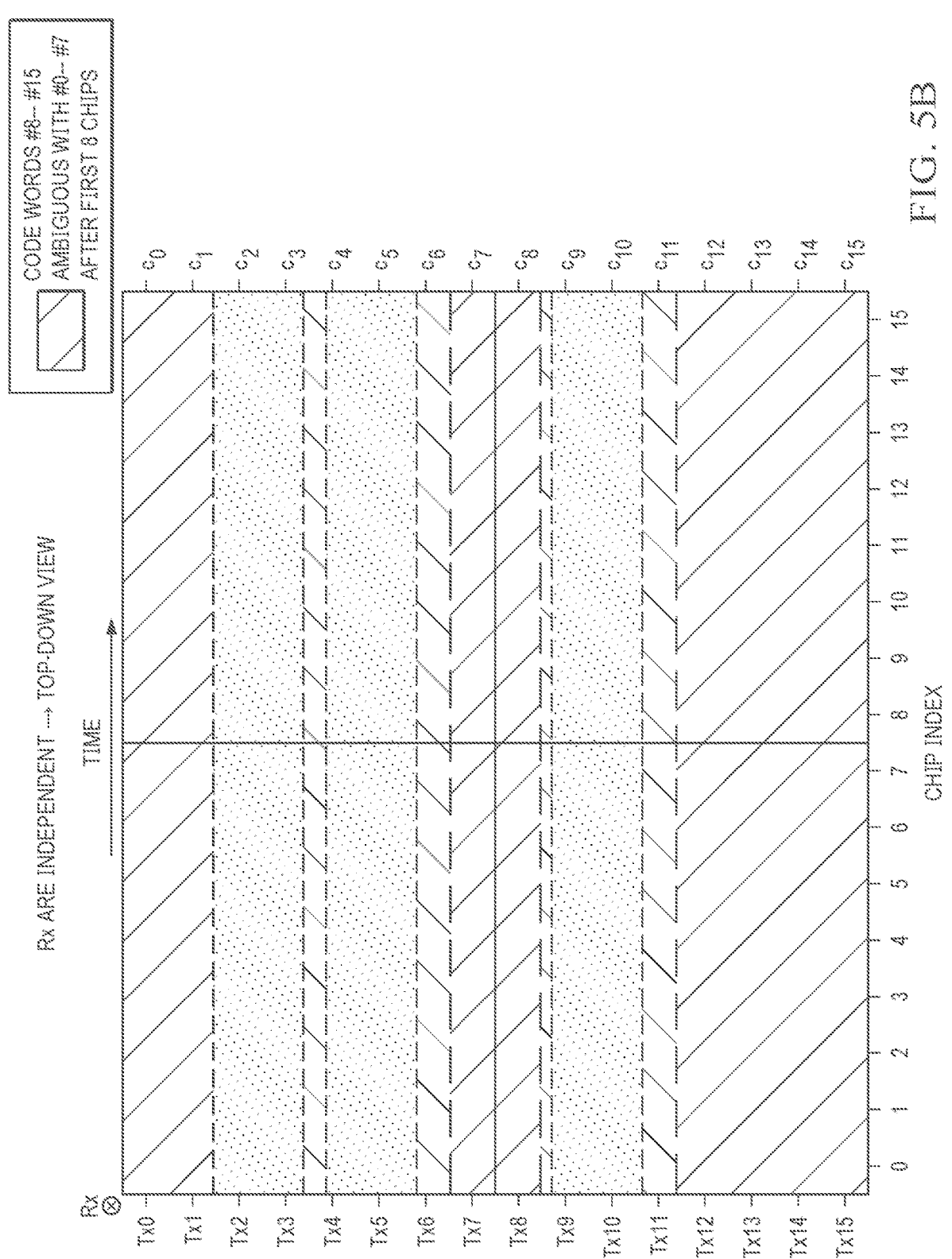
FIG. 5B shows an adapted code-word-to-TX (S2T) mapping yielding un-ambiguous detection after eight chips for the touch surface shown in FIG. 5A, wherein the adapted mapping is different than a default mapping and may be based on a prior touch estimation.

FIG. 5A shows a touch surface and time axis, illustrating two fingers covering Tx electrodes Tx2 to Tx6, and one finger covering Tx electrodes Tx9 to Tx11. FIG. 5B shows an adapted code-word-to-TX (S2T) mapping, wherein code words are mapped as follows: C0→Tx2; C1→Tx3; C2→Tx4; C3→Tx5; C4→Tx6; C5→Tx9; C6→Tx10; and C7→Tx11. This adaptive mapping may yield un-ambiguous detection after eight chips for the touch surface and finger touch positions shown in FIG. 5A. One way to avoid an ambiguity is to confirm by a prior touch estimate that all of the touches are on transmit electrodes Tx0-Tx7, so the current, touching finger(s) may be assumed to be located on transmit electrodes Tx0-Tx7. However, in this example of FIGS. 5A-5B, the ambiguity problem may be solved for finger touches on any Tx electrodes, provided that sufficiently many Tx electrodes remain untouched or, more precisely, the respective Tx-Rx channels may be assumed to yield zero signal deviation. The first eight spreading sequences or code words in $H_{16}$ are adaptively assigned to the touched Tx electrodes. In particular, the two fingers covering Tx electrodes Tx2 to Tx6 and one finger covering Tx electrodes Tx9 to Tx11 shown in FIGS. 5A, are adaptively assigned, respectively, to code words $$c_0^{(16)} \text{ to } c_4^{(16)} \text{ and } c_5^{(16)} \text{ to } c_7^{(16)},$$

as shown in FIG. 5B. This is an adapted code-word-to-TX (S2T) assignment or mapping. This assignment can be represented by multiplication of the code word matrix with a code-word-to-Tx mapping matrix $\Gamma$. For the example in FIGS. 5A-5B, multiplication of the code word matrix with a code-word-to-Tx mapping matrix $\Gamma$, is $\Gamma \cdot H_{16}$ with $$\Gamma = \begin{bmatrix} 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 \\ 1 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 0 & 0 & 1 \end{bmatrix}$$

The sequences or code words may be spread by Sylvester's construction. For Hadamard matrices computed with Sylvester's recursive construction with $$H_{2^k} = \begin{bmatrix} H_{2^{k-1}} & H_{2^{k-1}} \\ H_{2^{k-1}} & -H_{2^{k-1}} \end{bmatrix}$$

and $H_1=[1]$, latency may be further reduced.

According to one aspect, the Hadamard matrix $H_{16}$ may be expressed as $$H_{16} = \begin{bmatrix} H_8 & H_8 \\ H_8 & -H_8 \end{bmatrix} = \begin{bmatrix} \begin{bmatrix} H_4 & H_4 \\ H_4 & -H_4 \end{bmatrix} & \begin{bmatrix} H_4 & H_4 \\ H_4 & -H_4 \end{bmatrix} \\ \begin{bmatrix} H_4 & H_4 \\ H_4 & -H_4 \end{bmatrix} & -\begin{bmatrix} H_4 & H_4 \\ H_4 & -H_4 \end{bmatrix} \end{bmatrix}$$

which implies that if at most four Tx electrodes are being touched, the first four rows of $H_{16}$ may be adaptively assigned to the Tx electrodes being touched, so that the signal may be effectively decoded after having received the first four chips. In other words, when there are finger touches only on Tx electrodes to which the first four rows of $H_{16}$ are assigned as code words, then the finger positioning can take place already after having received data for the first four chips. This process can be played down to a single touched electrode. Because the first eight spreading sequences or code words in $H_{16}$ are adaptively assigned to the touched Tx electrodes, there is no ambiguity.

Figures 6, 7:
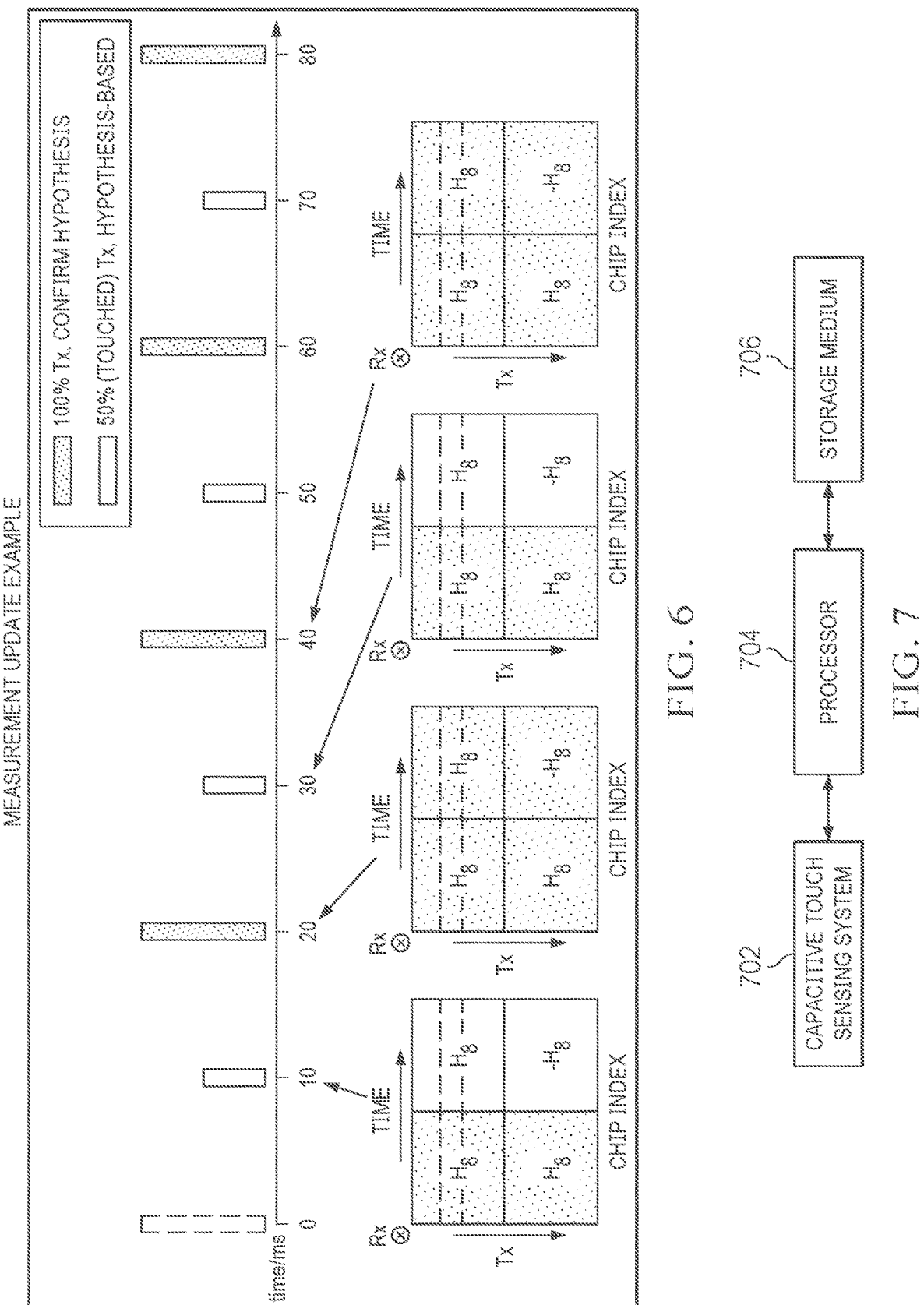
FIG. 6 shows a timeline where alternatingly transmissions 100% and 50% of code-division multiple access data. The 50% of code-division multiple access data is based on code word portions or an incomplete set of code words to estimate a signal deviation matrix of a capacitive touch sensing system.
FIG. 7 shows a block diagram of a system having a capacitive touch sensing system, a processor and a storage medium.

FIG. 6 shows a graph with an example of the measurement and finger position estimate update over time. In this example, at ten millisecond intervals, the system has alternatingly received 50% and 100% of the chips, for 50% and 100% estimates, respectively. At 0 milliseconds, no previous information is given about finger positions on the touch sensor. Therefore, a default assignment or mapping of code words to Tx electrodes is applied, which is why the data bar is shown as an outline rather than a solid bar. At 10 milliseconds, the graph shows that the system received data for the first eight chips. If there would have been prior touch information at time 0ms, and if the code word to Tx mapping could have been applied such that to all touched Tx electrodes were assigned code words from the first eight rows of the Hadamard matrix H16, then a position estimate update could be computed for the respective Tx electrodes. However, as there was no prior touch information available at time 0ms, a sensible position estimate update could not be computed at this 0ms time. At 20 milliseconds, the graph shows that the system received 100% of the transmitted code words, implying that position estimate updates were computed for 100% of the transmit electrodes ("100% Tx") by de-spreading the receive data with the code words from a full-sized Hadamard matrix, which also implies signal deviation estimates with improved SNR compared to the 50% Tx estimates where only the first halves of the full code words are employed. Also at 20 milliseconds, because there was information about finger touches available, an adapted code-word-to-Tx mapping is applied for the next measurement cycle, ensuring that all touched Tx electrodes have mapped code words from the set $\{c0, c1, \ldots, c7\}$. At 30 ms with the next 50% Tx estimate, touch position estimate updates are computed for the Tx electrodes associated with code words $c0, \ldots, c7$ using the receive data for the first eight transmitted chips and code words from the rows of Hadamard matrix H8. At 40 ms after receiving data for all sixteen transmitted chips, touch position updates are computed for all sixteen Tx electrodes, and a new adapted code word to Tx map is prepared for the next measurement cycle. The graph shows these steps are repeated at 50 and 60 milliseconds, and again at 70 and 80 milliseconds. Report estimates may be provided by serially and alternatingly decoding the first portion of the receive signal (50%) and decoding the complete receive signal (100%). Thus, signal deviation matrices providing estimates of touch position(s) may be reported at more frequent time intervals.

A detection system that makes alternating 50% and 100% report estimates may provide an increase of the report rate of the touch position estimates. In this case, an estimate of the touch position is decoded by the detection system on 10 millisecond intervals. Whereas, if 100% estimates are exclusively decoded, the detection system may estimate the touch position on 20 millisecond intervals. By making estimates based on the first eight chips of the eight code words of the first subset of transmit electrodes (50% estimate), wherein code words are adaptively mapped based on information from previous estimates, in addition to making estimates based on the full sixteen chips of the sixteen code words of the combined first and second subsets of transmit electrodes (100% estimate), the detection system may make estimates at 10 millisecond intervals. Detections systems may make estimates of touch position(s) at 10 millisecond intervals, 5 millisecond intervals, 1 millisecond intervals, or any time interval greater than or equal to 1 millisecond. Detection systems may report estimates of touch position(s) at 50 Hz, 100 Hz, 150 Hz, 200 Hz, or any report rate faster than or equal to 50 Hz. Signal deviation matrices providing estimates of touch position(s) may be reported at time intervals.

A first set of data may be transmitted to provide a 50% estimate, a second set of data may be transmitted to provide a 100% estimate, a third set of data may be transmitted to provide another 50% estimate, and so forth. Subsequent estimates may be based on prior assumptions about the number of touching fingers and their positions. An estimate at a point in time may be based on transmission of code word portions comprising 50% or more of the code words, respectively, for example the first eight chips of sixteen chip code words or any number of chips between eight and sixteen. An estimate at another point in time may be based on transmission of code word portions comprising 50% or less of the code words, respectively, for example the first eight chips of sixteen chip code words or any number of chips between one and eight.

FIG. 7 shows a block diagram of a system having a capacitive touch sensing system 702, a processor 704, and a storage medium 706. The capacitive touch sensing system 702 may comprise transmit electrodes and receive electrodes positioned to have mutual capacitances between transmit electrodes and receive electrodes at their intersections called nodes, wherein the capacitance at respective ones of nodes deviates when a node is touched. The processor 704 may be a microcontroller. The machine readable storage medium 706 storing instructions, which when executed by the processor, may cause the system to: assign a code word to respective ones of transmit electrodes of the set of transmit electrodes, wherein respective ones of code words is a complete code word having a first code word portion and a second code word portion; identify a first subset of transmit electrodes and their assigned code words based on a prior touch position estimate; identify a second subset of transmit electrodes and their assigned code words; generate a transmit signal for respective ones of transmit electrodes of the first subset of transmit electrodes according to its assigned code word; transmit the transmit signals; receive a first portion of a receive signal, for respective ones of receive electrodes, indicative of the respective capacitances between the receive electrode and respective ones of the transmit electrodes of the first subset of transmit electrodes; decode the first portion of the receive signal for respective ones of receive electrodes using the first portions of the first subset of code words; and compute touch position estimates for the first subset of transmit electrodes based on the decoded first portions of the receive signals.

FIG. 8 shows a flow chart of method. A capacitive touch sensing system is provided 802 comprising transmit electrodes and receive electrodes positioned to have mutual capacitances between transmit electrodes and receiver electrodes at node intersections, wherein the capacitance at respective ones of nodes deviates when touched. A code word is assigned 804 to respective ones of transmit electrodes of the set of transmit electrodes, wherein respective ones of code words is a complete code word having a first code word portion and a second code word portion. A first subset of transmit electrodes and their assigned code words is identified 806 based on a prior touch position estimate. A second subset of transmit electrodes and their assigned code words are identified 808. A transmit signal is generated 810 for respective ones of transmit electrodes of the first subset of transmit electrodes according to its assigned code word; and the transmit signal is transmitted 812. A first portion of a receive signal is received 814, for respective ones of receive electrodes, indicative of the respective capacitances between the receive electrode and respective ones of transmit electrodes of the first subset of transmit electrodes. The first portion of the receive signal is decoded 816 for respective ones of receive electrodes using the first portions of the first subset of code words. Touch position estimates are computed 818 for the first subset of transmit electrodes based on the decoded first portions of the receive signals.

Aspects may also apply to other sets of code words, and also when employing code words with near-zero cross-correlation also for non-zero time-shifts between two code words in the correlation function.

According to an aspect, there is provided the spreading gain, i.e., the signal-to-noise ratio (SNR) gain due to CDM vs. Time-Division Multiplexing (TDM, where only one transmit electrode has a non-zero stimulus at a time) after receiving half the number of chips of the code words is half of what it is after receiving the full number of chips of the code words. For example, the SNR of a 100% estimate may be twice the SNR of a 50% estimate, because of the so-called spreading gain.

Although examples have been described above, other variations and examples may be made from this disclosure without departing from the spirit and scope of these disclosed examples.

The invention claimed is:

1. A method comprising:

providing a capacitive touch sensing system comprising transmit electrodes and receive electrodes positioned to have mutual capacitances between transmit electrodes and receive electrodes at electrode intersections called nodes, wherein the capacitance at respective ones of nodes deviates when touched; and performing a touch position estimate by:

identifying a first and a second subset of transmit electrodes based on a prior touch position estimate, wherein at least one of the first subset of transmit electrodes is identified as touched or identified as assumed touched based on the prior touch position estimate, wherein the transmit electrodes of the second subset of transmit electrodes have been identified as not touched or identified as assumed not touched based on the prior touch position estimate;

assigning code words from a first subset of code words to respective ones of transmit electrodes of the first subset of transmit electrodes, wherein respective ones of code words from the first subset of code words are a complete code word having a first code word portion and a second code word portion;

assigning code words from a second subset of code words to respective ones of transmit electrodes of the second subset of transmit electrodes, wherein respective ones of code words from the second subset of code words are a complete code word having a first code word portion and a second code word portion;

generating a transmit signal for respective ones of transmit electrodes according to its assigned code word;

transmitting the transmit signals;

receiving a first portion of a receive signal, for respective ones of receive electrodes, indicative of the respective capacitances between the receive electrode and respective ones of transmit electrodes;

decoding the first portion of the receive signal for respective ones of receive electrodes using the first portions of the first subset of code words before the second portion of the first subset of code words of the receive signal is received; and computing a touch position estimate for the first subset of transmit electrodes based on the decoded first portions of the receive signals.

2. The method as in claim 1, comprising:

receiving a second portion of receive signal for respective ones of receive electrodes;

decoding a complete receive signal for respective ones of receive electrodes using the complete code words; and computing a touch position estimate for a set of transmit electrodes based on decoded complete receive signals.

3. The method as in claim 2, comprises serially and alternatingly decoding the first portion of the first subset of code words of the receive signal and decoding the complete receive signal.

4. The method as in claim 1, comprising default assigning respective ones of code words from the first subset of code words to respective ones of the first subset of transmit electrodes and default assigning respective ones of code words from the second subset of code words to respective ones of the second subset of transmit electrodes.

5. The method as in claim 4, wherein code words comprise unique numbers, wherein transmit electrodes are numbered uniquely, and wherein the default assigning comprises assigning a code word with a lowest number to a lowest numbered transmit electrode, and assigning a code word with a second lowest number to a second lowest numbered transmit electrode.

6. The method as in claim 1, comprising repeating the performing a touch position estimate.

7. The method as in claim 1, wherein assigning respective ones of code words from the first subset of code words to respective ones of the first subset of transmit electrodes comprises: adaptive assigning respective ones of code words from the first subset of code words to transmit electrodes identified as having been touched or identified as assumed to have been touched based on the prior touch position estimate, and wherein assigning respective ones of code words from the second subset of code words to respective ones of the second subset of transmit electrodes comprises: adaptive assigning respective ones of code words from the second subset of code words to transmit electrodes identified as having not been touched or identified as assumed to have not been touched based on the prior touch position estimate.

8. The method as in claim 1, wherein assigning respective ones of code words from the second subset of code words to respective ones of the second subset of transmit electrodes comprises: adaptive assigning respective ones of code words from the second subset of code words to transmit electrodes identified as having not been touched or identified as assumed to have not been touched based on the prior touch position estimate, and wherein assigning respective ones of code words from the first subset of code words to respective ones of the first subset of transmit electrodes comprises: adaptive assigning respective ones of code words from the first subset of code words to remaining unassigned transmit electrodes.

9. The method as in claim 1, wherein respective ones of the code words comprise binary sequences having 2*K chips of a Hadamard matrix where K is an integer, wherein the code word portions of respective ones of the code words comprise K chips.

10. The method as in claim 9, wherein respective ones of the code words comprise sixteen chips, wherein the code word portions of respective ones of the code words comprise eight chips, and the Hadamard matrix is a 16×16 matrix comprising two code word portions.

11. The method as in claim 9, wherein decoding comprises despreading the receive signal using code words from rows of the Hadamard matrix.

12. The method as in claim 9, wherein the Hadamard matrix comprises four quadrants, wherein the respective ones of the four quadrants comprise a Hadamard matrix themselves.

13. A system comprising:

a capacitive touch sensing system comprising transmit electrodes and receive electrodes positioned to have mutual capacitances between transmit electrodes and receive electrodes at electrode intersections called nodes, wherein the capacitance at respective ones of nodes deviates when touched;

a processor; and a machine readable storage medium storing instructions, which when executed by the processor, cause the system to:

identify a first and a second subset of transmit electrodes based on a prior touch position estimate, wherein at least one of the first subset of transmit electrodes is identified as touched or identified as assumed touched based on the prior touch position estimate, wherein the transmit electrodes of the second subset of transmit electrodes have been identified as not touched or identified as assumed not touched based on the prior touch position estimate;

assign code words from a first subset of code words to respective ones of transmit electrodes of the first set of transmit electrodes, wherein respective ones of code words from the first subset of code words are a complete code word having a first code word portion and a second code word portion;

assign code words from a second subset of code words to respective ones of transmit electrodes of the second subset of transmit electrodes, wherein respective ones of code words from the second set of code words are a complete code word having a first code word portion and a second code word portion;

generate a transmit signal for respective ones of transmit electrodes according to its assigned code word;

transmit the transmit signals;

receive a first portion of a receive signal, for respective ones of receive electrodes, indicative of the respective capacitances between the receive electrode and respective ones of transmit electrodes;

decode the first portion of the receive signal for respective ones of receive electrodes using the first portions of the first subset of code words before the second portion of the first subset of code words of the receive signal is received; and compute touch position estimates for the first subset of transmit electrodes based on decoded first portions of the receive signals, whereby a touch estimate is performed.

14. The system as in claim 13, wherein the instructions, which when executed by the processor, cause the system to:

receive a second portion of receive signal for respective ones of receive electrodes;

decode a complete receive signal for respective ones of receive electrodes using the complete code words; and compute touch position estimates for the subset of transmit electrodes based on decoded complete receive signals.

15. The system as in claim 14, wherein the instructions, which when executed by the processor, cause the system to serially and alternatingly decode the first portion of the first subset of code words of the receive signal and decode a complete receive signal.

16. The system as in claim 13, wherein the instructions, which when executed by the processor, cause the system to default assign respective ones of code words from the first subset of code words to respective ones of the first subset of transmit electrodes and default assign respective ones of code words from the second subset of code words to respective ones of the second subset of transmit electrodes.

17. The system as in claim 16, wherein code words comprise unique numbers, wherein transmit electrodes are numbered uniquely, and wherein the default assigning comprises assigning a code word with a lowest number to a lowest numbered transmit electrode, and assigning a code word with a second lowest number to a second lowest numbered transmit electrode.

18. The system as in claim 13, wherein the instructions, which when executed by the processor, cause the system to repeatedly perform a touch position estimate.

19. The system as in claim 13, wherein the instructions, which when executed by the processor, cause the system to:
    adaptively assign respective ones of code words to transmit electrodes identified as having been touched or identified as assumed to have been touched based on the prior touch position estimate, and
    adaptively assign respective ones of code words to transmit electrodes identified as having not been touched or identified as assumed to have not been touched based on the prior touch position estimate.

20. The system as in claim 13, wherein assign respective ones of code words from the second subset of code words to respective ones of the second subset of transmit electrodes comprises: adaptive assign respective ones of code words from the second subset of code words to transmit electrodes identified as having not been touched or identified as assumed to have not been touched based on the prior touch position estimate, and wherein assign respective ones of code words from the first subset of code words to respective ones of the first subset of transmit electrodes comprises: adaptive assign respective ones of code words from the first subset of code words to remaining unassigned transmit electrodes.

21. The system as in claim 13, wherein respective ones of the code words comprise binary sequences having 2*K chips of a Hadamard matrix where K is an integer, wherein the code word portions of respective ones of the code words comprise K chips.

22. The system as in claim 21, wherein respective ones of the code words comprise sixteen chips, wherein the code word portions of respective ones of the code words comprise eight chips, and the Hadamard matrix is an 16×16 matrix comprising two code word portions.

23. The system as in claim 21, wherein decoding comprises despreading a receive signal using code words from rows of the Hadamard matrix.

24. The system as in claim 21, wherein the Hadamard matrix comprises four quadrants, wherein the respective ones of the four quadrants comprise a Hadamard matrix.

\*    \*    \*    \*    \*